US009841578B2

(12) United States Patent
Kuroda

(10) Patent No.: US 9,841,578 B2
(45) Date of Patent: Dec. 12, 2017

(54) PROJECTOR

(71) Applicant: FUJIFILM Corporation, Tokyo (JP)

(72) Inventor: Yasuto Kuroda, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/589,554

(22) Filed: May 8, 2017

(65) Prior Publication Data

US 2017/0242213 A1 Aug. 24, 2017

Related U.S. Application Data

(63) Continuation of application No. PCT/JP2015/081625, filed on Nov. 10, 2015.

(30) Foreign Application Priority Data

Nov. 27, 2014 (JP) .................................. 2014-239517

(51) Int. Cl.
*G03B 21/14* (2006.01)
*G03B 21/16* (2006.01)
*G02B 7/02* (2006.01)

(52) U.S. Cl.
CPC ............. *G02B 7/028* (2013.01); *G03B 21/14* (2013.01); *G03B 21/145* (2013.01); *G03B 21/16* (2013.01)

(58) Field of Classification Search
CPC .. G03B 21/142; G03B 21/145; G03B 21/147; G03B 21/16

(Continued)

(56) References Cited

U.S. PATENT DOCUMENTS 8,879,007 B2 * 11/2014 Hayashi .................. G03B 3/00
349/5
9,726,964 B2 * 8/2017 Enokishima ......... G03B 21/145
(Continued)

FOREIGN PATENT DOCUMENTS

JP 2002-207168 A 7/2002
JP 2009-92817 A 4/2009
(Continued)

OTHER PUBLICATIONS

International Search Report issued PCT/JP2015/081625 (PCT/ISA/210), dated Jan. 26, 2016.
(Continued)

*Primary Examiner* — William C Dowling
(74) *Attorney, Agent, or Firm* — Birch, Stewart, Kolasch & Birch, LLP

(57) ABSTRACT

A projector includes an image forming panel 14 on which an image is formed, and a projection lens 15 which projects the image of the image forming panel 14. In a projector in which the center of the image forming panel 14 is fixed with being shifted in a direction opposite to a direction in which a central position of the projected image of the image forming panel 14 is deviated with respect to an optical axis L of the projection lens 15, a lens barrel 31 of the projection lens 15 includes heater 33 for heating a lens barrel portion on a side opposite to a direction, in which the image forming panel 14 is shifted, on the image forming panel 14 side from the diaphragm position 32 where an F-Number of the projection lens is determined. Cooler may be provided in place of the heater.

20 Claims, 6 Drawing Sheets

(58) Field of Classification Search
USPC .................................... 353/69, 70, 100, 101
See application file for complete search history.

(56) References Cited

U.S. PATENT DOCUMENTS

| | | | |
|---|---|---|---|
| 2006/0007556 A1* | 1/2006 | Okajima | G02B 7/028 359/649 |
| 2012/0162753 A1 | 6/2012 | Tatsuno | |
| 2017/0242324 A1* | 8/2017 | Kuroda | G03B 21/16 |

FOREIGN PATENT DOCUMENTS

| | | |
|---|---|---|
| JP | 2010-243542 A | 10/2010 |
| JP | 2010-244017 A | 10/2010 |
| JP | 2011-209394 A | 10/2011 |
| JP | 2012-137622 A | 7/2012 |

OTHER PUBLICATIONS

Written Opinion of the International Searching Authority issued PCT/JP2015/081625 (PCT/ISA/237), dated Jan. 26, 2016.

* cited by examiner

PROJECTOR

CROSS-REFERENCE TO RELATED APPLICATIONS

This application is a Continuation of PCT International Application No. PCT/JP2015/081625 filed on Nov. 10, 2015, which claims priority under 35 U.S.C §119(a) to Japanese Patent Application No. 2014-239517 filed on Nov. 27, 2014. Each of the above application(s) is hereby expressly incorporated by reference, in its entirety, into the present application.

BACKGROUND OF THE INVENTION

1. Field of the Invention

The present invention relates to a projector, and in particular, to a projector in which an image forming panel is shifted and fixed.

2. Description of the Related Art

A projector which projects light with an image by a light modulation device, such as a liquid crystal display (LCD) or a digital micromirror device (DMD), toward a screen and displays the image on the screen is known. In the projector, light (illumination light) emitted from a light source device is given an image according to an image signal (image information) by the light modulation device (image forming device) and is emitted from the projection lens as image light, and the image is projected onto the screen. If an optical axis of the projection lens is perpendicular to the screen, the image displayed on the image forming device is enlarged as it is and is projected onto the screen; however, usually, there are many cases where the screen is disposed upward the projector.

In this way, in a case where the screen is disposed with being shifted with respect to the optical axis of the projection lens of the projector, an image forming panel is disposed in a direction opposite to a direction in which the screen is shifted with respect to the optical axis of the projection lens, and the image displayed on the image forming panel is projected onto the screen on an enlarged scaled as it is.

JP2011-209394A described below describes that, in order to eliminate variation in a focal position of a projection optical device with an increase in temperature of a projection lens, heating control of a group of a plurality of lenses provided in a traveling direction of light is performed. In addition, JP2010-243542A described below describes that an aberration correction lens is cooled by cooling the inside of a barrel having a lens, thereby suppressing change in aberration of a projection lens due to an increase in temperature and preventing degradation of quality of a projected image.

SUMMARY OF THE INVENTION

However, if the image forming panel is shifted in a given direction and the image is projected on the screen, light passes through the image forming panel with being deviated from the center of the optical axis of the projection lens in a direction, in which the image forming panel is shifted. As a result, since an increase in temperature occurs at a position inside the projection lens through which light passes, a difference in temperature occurs between a side (hereinafter, referred to as the lower side of the projection lens) of the projection lens on which the image forming panel is shifted and an opposite side (hereinafter, referred to as the upper side of the projection lens) thereof. If a difference in temperature occurs between the upper side and the lower side of the projection lens, a partial increase in temperature of the projection lens causes deformation of a member holding a lens, and inclination or displacement occurs in the projection lens (including a part of a plurality of lenses constituting the projection lens). If the projection lens is inclined, optical performance of the projection lens may vary from a design value, and quality of an image projected onto the screen may be degraded.

JP2011-209394A and JP2010-243542A describe that, in order to stabilize quality of a projected image, temperature adjustment in the barrel is performed by heater or cooler; however, a difference in temperature in a surface direction (a direction perpendicular to the traveling direction of light) of the projection lens has not been studied.

The present invention has been accomplished in consideration of such a situation, and an object of the invention is to provide a projector capable of suppressing degradation of quality of an image to be projected by suppressing a temperature distribution in a surface direction of a projection lens and preventing unnecessary inclination and displacement due to a difference in temperature between an upper side and a lower side of the projection lens.

In order to attain the above-described object, an aspect of the invention provides a projector comprising an image forming panel on which an image is formed, and a projection lens which projects the image of the image forming panel. The center of the image forming panel is fixed with being shifted with respect to an optical axis of the projection lens, and a central position of the projected image of the image forming panel is deviated in a direction opposite to a direction, in which the center of the image forming panel is shifted. A lens barrel of the projection lens includes heater for heating a lens barrel portion on a side opposite to the direction, in which the image forming panel is shifted, on the image forming panel side from a diaphragm position where an F-Number of the projection lens is determined.

According to the aspect of the invention, in regard to the projector in which the image forming panel is shifted in a direction opposite to a direction, in which the central position of the projected image of the image forming panel is deviated, with respect to the optical axis of the projection lens, the lens barrel portion of the projection lens is heated and temperature control is performed, whereby it is possible to prevent degradation of quality of an image to be projected.

In the projector in which the image forming panel is shifted, the position of the projection lens, through which light passes, is deviated with respect to the optical axis of the projection lens, and the position, through which light passes, is biased, causing the difference in temperature between the upper side and the lower side of the projection lens. If the difference in temperature occurs between the upper side and the lower side of the projection lens, a holding portion of a lens in the projection lens is partially increased in temperature, causing inclination of a lens and degradation of quality of a projected image.

The heater for heating the lens barrel portion on a side opposite to the direction, in which the image forming panel is shifted, is provided, whereby, since it is possible to reduce the difference in temperature in a direction perpendicular to a passage direction of light of the projection lens, for example, between the upper side and a lower side of the projection lens, and to prevent the projection lens from being inclined, it is possible to suppress degradation of quality of an image.

Since the path through which light passes is reversed to the shift direction of the image forming panel at the diaphragm position, by providing the heater on the image forming panel side from the diaphragm position where the F-Number of the projection lens is determined, it is possible to provide the heater on a side the temperature of the projection lens is low, and to further reduce the difference in temperature between the upper side and the lower side of the projection lens.

In another aspect of the invention, it is preferable that the projector further comprises a first sensor which measures a temperature of the lens barrel on the side opposite to the direction, in which the image forming panel is shifted, a second sensor which measures a temperature of the lens barrel in the direction, in which the image forming panel is shifted, and controller for controlling the heater based on the difference between a measurement result of the temperature of the lens barrel by the first sensor and a measurement result of the temperature of the lens barrel by the second sensor.

According to this aspect, the first sensor and the second sensor are provided, and the heater is controlled based on the difference in temperature of the lens barrel measured by the first sensor and the second sensor, whereby it is possible to further reduce the difference in temperature between the upper side and the lower side of the projection lens.

In another aspect of the invention, it is preferable that the controller heats with the heater until the difference between the measurement result of the temperature of the lens barrel by the first sensor and the measurement result of the temperature of the lens barrel by the second sensor becomes equal to or less than a predetermined difference in temperature.

According to this aspect, heating with the heater is performed until the difference between the measurement result of the temperature of the lens barrel measured by the first sensor and the measurement result of the temperature of the lens barrel measured by the second sensor becomes equal to or less than the predetermined difference in temperature, whereby it is possible to further reduce the difference in temperature between the upper side and the lower side of the projection lens.

The "predetermined difference in temperature" is a difference in temperature in a range capable of preventing the projection lens from being inclined due to the difference in temperature between the measurement result of the temperature of the lens barrel measured by the first sensor and the measurement result of the temperature of the lens barrel measured by the second sensor, and suppressing degradation of quality of an image to be formed, and is appropriately determined according to a material of a member holding a lens, optical design values, the performance of the projector, and the like. The difference in temperature between the temperature of the lens barrel measured by the first sensor and the temperature of the lens barrel measured by the second sensor is preferably equal to or less than 50° C., and more preferably, equal to or less than 30° C.

In another aspect of the invention, it is preferable that the heater is provided in the lens barrel at a position of a lens having the greatest influence on degradation of lens performance due to the difference in temperature of the projection lens between a direction, in which the image forming panel is shifted, and a direction opposite to the direction, in which the image forming panel is shifted, on the image forming panel side from the diaphragm position where the F-Number is determined, among a plurality of lenses constituting the projection lens.

According to this aspect, the heater is provided in the lens barrel at a position of a lens having the greatest influence on degradation of quality of an image to be formed due to the occurrence of the difference in temperature (the difference in temperature between the lower side and the upper side of the projection lens) in the projection lens between the direction, in which the image forming panel is shifted, and the direction opposite to the direction, in which the image forming panel is shifted, in the projection lens having a plurality of lenses, whereby it is possible to suppress the difference in temperature between an upper side and a lower side of a lens having an influence on degradation of performance low, to prevent a lens in the projection lens from being inclined, and to prevent degradation of quality of an image.

The "lens having the greatest influence on degradation of performance" refers to a lens which causes the most variation in the optical performance of the projection lens from a design value due to inclination or displacement of a lens among a plurality of lenses.

In order to attain the above-described object, another aspect of the invention provides a projector comprising an image forming panel on which an image is formed, and a projection lens which projects the image of the image forming panel. The center of the image forming panel is fixed with being shifted with respect to an optical axis of the projection lens, and a central position of the projected image of the image forming panel is deviated in a direction opposite to a direction, in which the center of the image forming panel is shifted. A lens barrel of the projection lens includes cooler for cooling a lens barrel portion in the direction, in which the image forming panel is shifted, on the image forming panel side from a diaphragm position where an F-Number of the projection lens is determined.

According to another aspect of the invention, in regard to the projector in which the image forming panel is shifted in a direction opposite to a direction, in which the central position of the projected image of the image forming panel is deviated, with respect to the optical axis of the projection lens, the lens barrel portion of the projection lens is cooled and temperature control is performed, whereby it is possible to prevent degradation of quality of an image to be projected.

In the projector in which the image forming panel is shifted, the position of the projection lens, through which light passes, is deviated with respect to the optical axis of the projection lens, and the position, through which light passes, is biased, causing the difference in temperature between the upper side and the lower side of the projection lens. If the difference in temperature occurs between the upper side and the lower side of the projection lens, a holding portion of a lens in the projection lens is partially increased in temperature, causing inclination of a lens and degradation of quality of a projected image.

The cooler for cooling the lens barrel portion in the direction, in which the image forming panel is shifted, is provided, whereby, since it is possible to further reduce the difference in temperature between the upper side and the lower side of the projection lens, and to prevent the projection lens from being inclined, it is possible to suppress degradation of quality of an image.

Since the path through which light passes is reversed to the shift direction of the image forming panel at the diaphragm position, by providing the cooler on the image forming panel side from the diaphragm position where the F-Number of the projection lens is determined, it is possible to provide the cooler on a side the temperature of the projection lens is high, and to further reduce the difference in temperature between the upper side and the lower side of the projection lens.

In another aspect of the invention, it is preferable that the cooler is a Peltier element or a heat sink having air blower.

This aspect specifics a specific example of the cooler, and the Peltier element or the heat sink having the air blower can be used as the cooler.

In another aspect of the invention, it is preferable that the projector further comprises a first sensor which measures a temperature of the lens barrel on the side opposite to the direction, in which the image forming panel is shifted, a second sensor which measures a temperature of the lens barrel in the direction, in which the image forming panel is shifted, and controller for controlling the cooler based on the difference between a measurement result of the temperature of the lens barrel by the first sensor and a measurement result of the temperature of the lens barrel by the second sensor.

According to this aspect, the first sensor and the second sensor are provided, and the cooler is controlled based on the difference in temperature of the lens barrel measured by the first sensor and the second sensor, whereby it is possible to further reduce the difference in temperature between the upper side and the lower side of the projection lens.

In another aspect of the invention, it is preferable that the controller cools with the cooler until the difference between the measurement result of the temperature of the lens barrel by the first sensor and the measurement result of the temperature of the lens barrel by the second sensor becomes equal to or less than a predetermined difference in temperature.

According to this aspect, cooling with the cooler is performed until the difference between the measurement result of the temperature of the lens barrel measured by the first sensor and the measurement result of the temperature of the lens barrel measured by the second sensor becomes equal to or less than the predetermined difference in temperature, whereby it is possible to further reduce the difference in temperature between the upper side and the lower side of the projection lens.

The "predetermined difference in temperature" is a difference in temperature in a range capable of preventing the projection lens from being inclined due to the difference in temperature between the measurement result of the temperature of the lens barrel measured by the first sensor and the measurement result of the temperature of the lens barrel measured by the second sensor, and suppressing degradation of quality of an image to be formed, and is appropriately determined according to a material of a member holding a lens, optical design values, the performance of the projector, and the like. The difference in temperature between the temperature of the lens barrel measured by the first sensor and the temperature of the lens barrel measured by the second sensor is preferably equal to or less than 50° C., and more preferably, equal to or less than 30° C.

In another aspect of the invention, it is preferable that the cooler is provided in a lens barrel portion at a position of a lens having the greatest influence on degradation of lens performance due to the difference in temperature of the projection lens between a direction, in which the image forming panel is shifted, and a direction opposite to the direction, in which the image forming panel is shifted, on the image forming panel side from the diaphragm position where the F-Number is determined, among a plurality of lenses constituting the projection lens.

According to this aspect, the cooler is provided in the lens barrel at a position of a lens having the greatest influence on degradation of quality of an image to be formed due to the occurrence of the difference in temperature (the difference in temperature between the lower side and the upper side of the projection lens) in the projection lens between the direction, in which the image forming panel is shifted, and the direction opposite to the direction, in which the image forming panel is shifted, in the projection lens having a plurality of lenses, whereby it is possible to suppress the difference in temperature between an upper side and a lower side of a lens having an influence on degradation of performance low, to prevent a lens in the projection lens from being inclined, and to prevent degradation of quality of an image.

The "lens having the greatest influence on degradation of performance" refers to a lens which causes the most variation in the optical performance of the projection lens from a design value due to inclination or displacement of a lens among a plurality of lenses.

In order to attain the above-described object, another aspect of the invention provides a projector comprising an image forming panel on which an image is formed, and a projection lens which projects the image of the image forming panel. The center of the image forming panel is fixed with being shifted with respect to an optical axis of the projection lens, and a central position of the projected image of the image forming panel is deviated in a direction opposite to a direction, in which the center of the image forming panel is shifted. A lens barrel of the projection lens includes heater for heating a lens barrel portion on a side opposite to the direction, in which the image forming panel is shifted, on the image forming panel side from a diaphragm position where an F-Number of the projection lens is determined, and cooler for cooling a lens barrel portion in the direction, in which the image forming panel is shifted, on the image forming panel side from the diaphragm position where the F-Number of the projection lens is determined.

According to another aspect of the invention, in regard to the projector in which the image forming panel is shifted in a direction opposite to a direction, in which the central position of the projected image of the image forming panel is deviated, with respect to the optical axis of the projection lens, the lens barrel portion of the projection lens is heated or cooled and temperature control is performed, whereby it is possible to prevent degradation of quality of an image to be projected.

In the projector in which the image forming panel is shifted, the position of the projection lens, through which light passes, is deviated with respect to the optical axis of the projection lens, and the position, through which light passes, is biased, causing the difference in temperature between the upper side and the lower side of the projection lens. If the difference in temperature occurs between the upper side and the lower side of the projection lens, one side of a holding portion of a lens in the projection lens is increased in temperature, causing inclination of a lens and degradation of quality of a projected image.

The heater for heating the lens barrel portion on a side opposite to the direction, in which the image forming panel is shifted, and the cooler for cooling the lens barrel portion in the direction, in which the image forming panel is shifted, are provided, whereby, since it is possible to further reduce the difference in temperature between the upper side and the lower side of the projection lens, and to prevent the projection lens from being inclined, it is possible to suppress degradation of quality of an image.

Since the path through which light passes is reversed to the shift direction of the image forming panel at the diaphragm position, by providing the heater on the image forming panel side from the diaphragm position where the F-Number of the projection lens is determined, it is possible to provide the heater on a side the temperature of the projection lens is low, to provide the cooler on a side the temperature of the projection lens is high, and to further reduce the difference in temperature between the upper side and the lower side of the projection lens.

In another aspect of the invention, it is preferable that the projector further comprises a first sensor which measures a temperature of the lens barrel on the side opposite to the direction, in which the image forming panel is shifted, in the projection lens, a second sensor which measures a temperature of the lens barrel in the direction, in which the image forming panel is shifted, in the projection lens, and controller for controlling the heater and the cooler selectively or simultaneously according to the difference in temperature between a measurement result of the temperature of the lens barrel by the first sensor and a measurement result of the temperature of the lens barrel by the second sensor.

According to this aspect, the first sensor and the second sensor are provided, and the heater and the cooler are controlled selectively or simultaneously according to the difference in temperature of the lens barrel measured by the first sensor and the second sensor, whereby it is possible to further reduce the difference in temperature between the upper side and the lower side of the projection lens, and to prevent degradation of quality of an image to be formed.

According to the invention, in regard to a projector in which an image forming panel is fixed with being shifted with respect to an optical axis of a projection lens, since it is possible to prevent inclination and displacement of a lens by reducing the difference in temperature between an upper side and a lower side of a lens constituting the projection lens, it is possible to suppress degradation of quality of an image to be projected.

DESCRIPTION OF THE PREFERRED EMBODIMENTS

Hereinafter, a projector according to the invention will be described referring to the accompanying drawings. In the following embodiments, although an example where an image is projected onto a screen will be described, in the invention, a projection surface is not limited to a screen, and the projector according to the invention can be used as a projector which projects an image onto various projection surfaces.

First Embodiment

Figure 1:
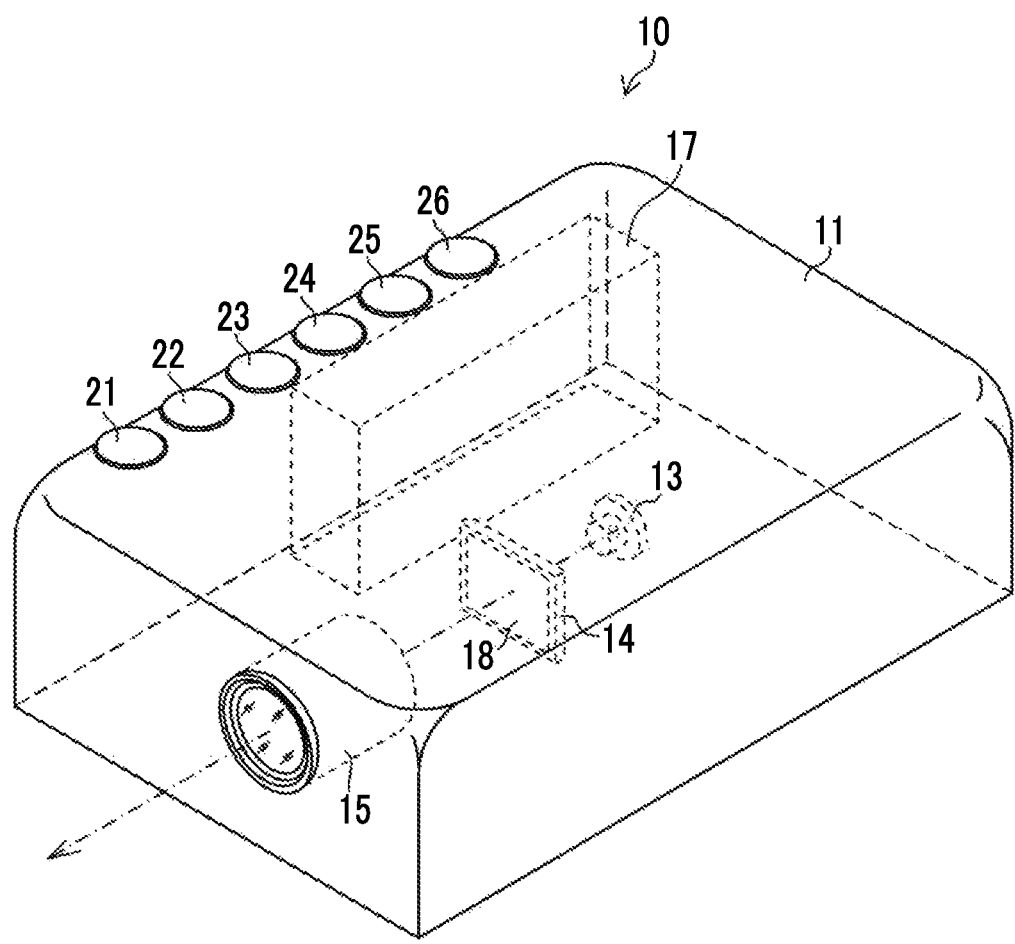
FIG. 1 is a schematic view showing the configuration of a projector of this embodiment.

FIG. 1 is a schematic view showing the configuration of a projector of this embodiment. A projector 10 of this embodiment has a structure in which a light source device 13, an image forming panel 14, a projection lens 15, and a control device 17 are housed in a housing 11 having a substantially rectangular parallelepiped. On a top surface of the housing 11, a zoom dial 21, a light amount adjustment dial 22, a focus dial 23, an up/down pint adjustment dial (tilt-and-shift operating member) 24, a right/left pint adjustment dial (tilt-and-shift operating member) 25, and a screen correction dial (screen shape correction member) 26 are provided. Light emitted from the light source device 13 is given an image on an image forming surface 18, is emitted from the projection lens 15, and is projected onto a screen (not shown in FIG. 1 and represented by reference numeral 20 in FIG. 3).

Figure 2:
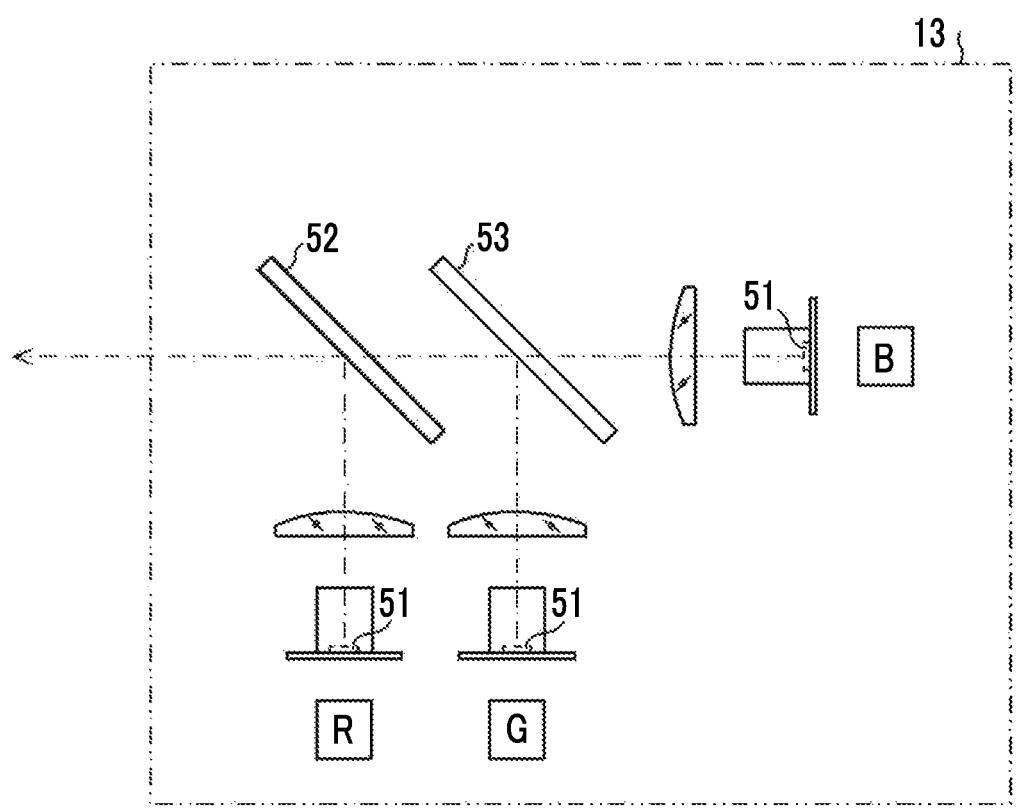
FIG. 2 is a schematic view of a light source device.

As shown in FIG. 2, the light source device 13 has light emitting diodes (LED) 51 which respectively emit light of three colors of RGB. Light emitted from the LED 51 of red (R) is reflected on a dichroic mirror 52, and light emitted from the LED 51 of green (G) is reflected by a dichroic mirror 53 and is transmitted through the dichroic mirror 52. Light emitted from the LED 51 of blue (B) is transmitted through the dichroic mirrors 52 and 53, whereby light of the three colors of RGB is emitted onto the same optical axis.

The control device 17 sequentially displays images of the three colors of RGB on the image forming surface 18, and synchronously emits light respectively from the LEDs 51 of the three colors in conformity with the images of the three colors. The control device 17 receives an operation signal of the zoom dial 21 to adjust the size of an image projected onto the screen 20, or receives an operation signal of the light amount adjustment dial 22 to adjust brightness of an image projected on the screen 20. In addition, the control device 17 operates a focus adjustment mechanism (not shown) of the projection lens 15 with an operation of the focus dial 23 to perform focus adjustment of a central portion of an image projected onto the screen 20. The drive of a heating device described below is also controlled by the control device 17.

As the image forming panel 14, a transmissive liquid crystal panel or a digital micromirror device can be used. The light source device 13 is not limited to an LED light source device which sequentially emits light of the three colors of RGB, and may be a light source device which uses a Xenon lamp or a halogen lamp emitting white light, and in this case, a transmissive color liquid crystal panel can be used as the image forming panel 14.

Figure 3:
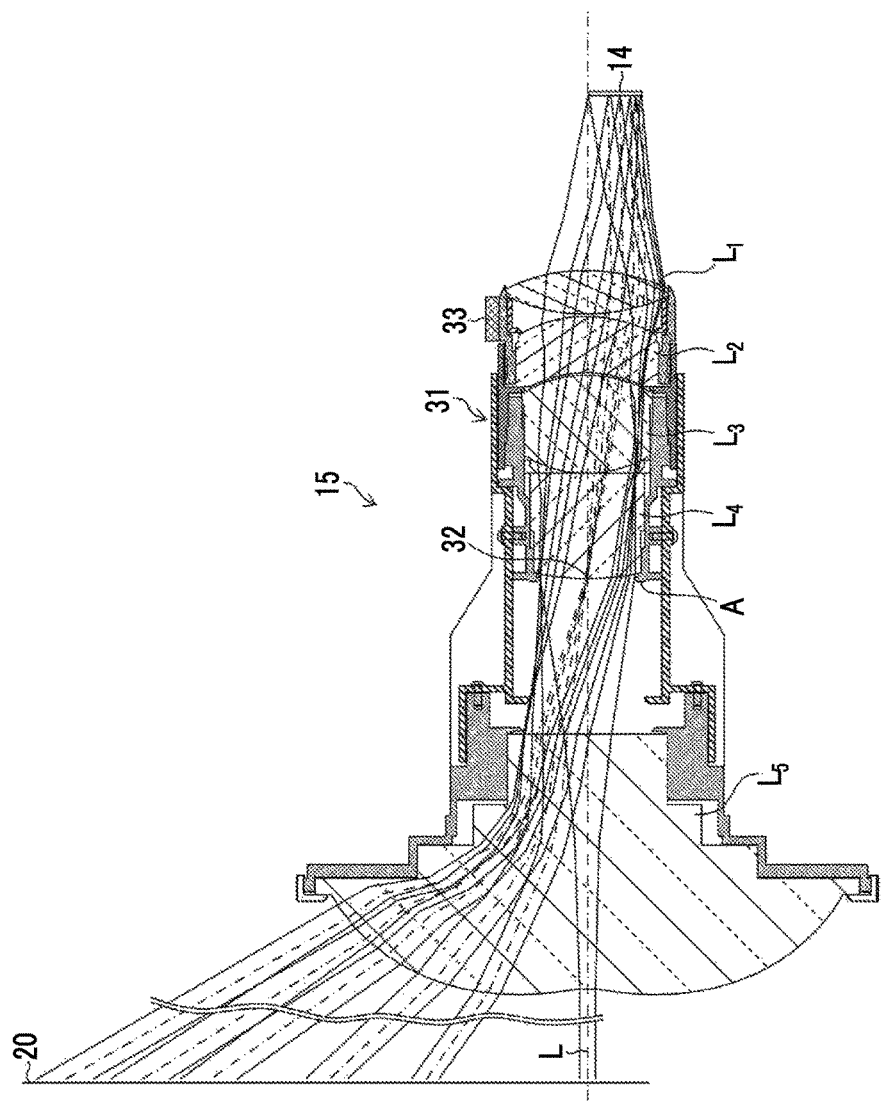
FIG. 3 is a sectional side view showing the configuration of a projection lens of a first embodiment.

FIG. 3 is a sectional side view showing the configuration of a projection lens of a first embodiment. As shown in FIG. 3, a forming position of an image is a position on the screen 20, and an image is projected on an upper side of FIG. 3 with respect to an optical axis L of the projection lens 15. The center of the image forming panel 14 is fixed with being shifted in a direction opposite to a deviation direction of a central position of the projected image (a projection surface of the screen 20) with respect to the optical axis L of the projection lens 15, that is, a lower side with respect to the optical axis of the projection lens 15.

Figure 4:
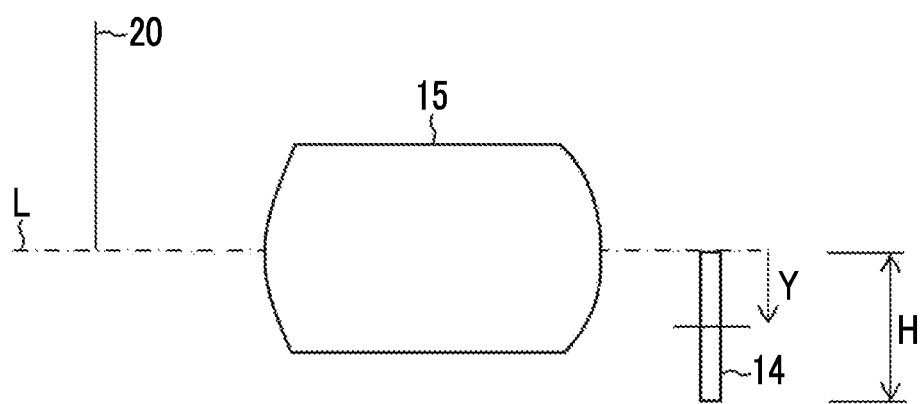
FIG. 4 is a diagram illustrating a shift amount of an image forming panel.

A shift amount of the image forming panel 14 will be described referring to FIG. 4. When Y: the shift amount (distance) from the optical axis L of the projection lens 15 to the center of the image forming panel and H: the length in the shift direction of the image forming panel 14, the amount (shift rate) S of shifting the image forming panel 14 is defined by S=Y/H. That is, when S=0.5, as shown in FIG. 4, this refers to a case where a cross-section of the image forming panel 14 matches the optical axis L of the projection lens 15. When S>0.5 (S is greater than 0.5), an end portion of the image forming panel 14 is shifted in a direction of being separated from the optical axis L of the projection lens 15. In a case where S=0, a layout (arrangement) close to a long-range projection type of the related art is formed in which the center of the image forming panel 14 matches the optical axis L of the projection lens 15. It is preferable that the amount S of shifting the image forming panel 14 exceeds 0.4 and is less than 0.7. From when the amount S of shifting the image forming panel 14 becomes equal to or less than a lower limit value, the influence of a temperature in a vertical direction of the projection lens becomes conspicuous. In a case where the amount S of shifting exceeds an upper limit value, since the shift amount of the image forming panel 14 becomes excessively large, it is not preferable in that a lens system becomes large, and manufacturing suitability is degraded. For this reason, the amount S of shifting the image forming panel 14 falls within the above-described range, whereby it is possible to provide a high-performance product while reducing the influence of the temperature in the vertical direction of the projection lens. It is more preferable that the amount S of shifting the image forming panel 14 exceeds 0.45 and is less than 0.6.

In this embodiment, the projection lens 15 is constituted of five lenses, and is constituted of, in order from the image forming panel 14 side, a first lens $L_1$ formed of a biconvex lens, a second lens $L_2$ formed of a concavo-convex surface with a concave surface on the screen 20 side, a third lens $L_3$ formed of a biconvex lens, a fourth lens $L_4$ formed of a plano-convex surface with a convex surface on the screen 20 side, and a fifth lens $L_5$ with a convex aspherical surface on the screen 20 side.

On an incidence surface side of the fourth lens $L_4$, a circular aperture diaphragm A which determines an F-Number is provided, and the position of the aperture diaphragm A becomes a diaphragm position 32. Although the aperture diaphragm A of this example is a fixed diaphragm, the invention is not limited thereto, and a variable diaphragm device which determines an F-Number may be provided between the fourth lens $L_4$ and the fifth lens $L_5$. As the variable diaphragm device, a known diaphragm device can be used, and for example, as described in the paragraph <0018> and FIGS. 3 and 4 of JP2011-227472A, a plurality of aperture leaf blades and a sliding plate (movable portion) are held between a lens frame and an aperture plate in a superimposed manner. Since the respective aperture leaf blades are positioned to be pivotally movable on the aperture plate, and the aperture leaf blades are pivoted by pivoting the sliding plate to enlarge or reduce the aperture diameter of the diaphragm, it is possible to adjust the diaphragm.

In FIG. 3, light incident into the projection lens 15 primarily passes through a lower side of the optical axis of the projection lens 15. Then, the passage path of light is reversed at the diaphragm position 32, and light primarily passes through an upper side of the projection lens 15 and is projected onto the screen 20. The passage path in the projection lens 15 of light passing through each position of the image forming panel 14 is indicated by a solid line, and the center of light is indicated by a one-dot-chain line.

The image forming panel 14 is disposed with being shifted to the lower side, whereby light primarily passes through a direction, in which the image forming panel 14 is shifted, in the projection lens 15, that is, the lower side with respect to the optical axis of the projection lens 15 to the diaphragm position 32 in the projection lens 15. Accordingly, the lower side (the side to which the image forming panel 14 is shifted) of the projection lens is heated with the passage of light, and a difference in temperature occurs in a direction perpendicular to the passage direction of light in the projection lens 15.

If a lens in the projection lens 15 is heated with the passage of light, there is a case where a member holding the lens is deformed by the influence of the temperature. In an area where the passage amount of light is small, since there is little increase in temperature, a difference in temperature occurs in the vertical direction of the projection lens with respect to the passage direction of light, that is, between the upper side and the lower side of the projection lens. If the difference in temperature is large, deformation due to heating partially occurs, the lens is inclined, and quality of an image to be formed is degraded. Since the rotation symmetry of the lens collapses due to the inclination of the lens, in addition of degradation of the resolution of an entire image to be formed is degraded, focusing position deviation or the like in a diagonal direction due to the occurrence of a field curvature occurs, resulting in degradation of performance of an entire projected image.

In the first embodiment, heater 33 for heating a lens barrel 31 on an area side in the projection lens, through which light does not pass, is provided. The heater 33 heats a lens barrel on the image forming panel side from the diaphragm position and on an area side in the projection lens, through which light does not pass, that is, a lens barrel portion on a side opposite to the shift direction of the image forming panel 14. With this, it is possible to reduce the difference from the temperature on the lower side increased with the passage of light, and to prevent inclination of a lens in the projection lens 15.

It is preferable that a first sensor which measures the temperature of the lens barrel of the projection lens on the side opposite to the direction, in which the image forming panel is shifted, and a second sensor which measures the temperature of the lens barrel of the projection lens in the direction, in which the image forming panel is shifted, are provided, and the heater 33 is controlled based on the difference between the temperatures of the lens barrel measured by the first sensor and the second sensor. The control of the heater can be performed by the control device (controller) 17 shown in FIG. 1. Specifically, it is preferable that the drive of the heater is controlled such that the difference between the measurement result of the temperature of the lens barrel measured by the first sensor and the measurement result of the temperature of the lens barrel measured by the second sensor becomes equal to or less than a predetermined difference in temperature. The "predetermined difference in temperature" is a range of obtaining the effects of the invention, and is a difference in temperature in a range such that the projection lens is prevented from being inclined and degradation of quality of an image to be formed is suppressed by maintaining the predetermined difference in temperature. The difference in temperature between the temperatures of the lens barrel measured by the first sensor and the second sensor is equal to or less than 50° C., and more preferably, is equal to or less than 30° C.

It is preferable that the heater 33 controls the temperature on a side, through which light is not transmitted, such that the temperature on a side, through which light passes, and the temperature on the side, through which light is not transmitted, have the predetermined difference in temperature in a state where the light source device 13 is turned on and a lens in the projection lens 15 is thermally saturated. The lens barrel opposite to the side, through which light passes, is heated in a state where a lens is thermally saturated, whereby it is possible to make the difference in temperature between the upper side and the lower side of the projection lens constant in a state where a lens in the projection lens 15 is thermally saturated, and to prevent inclination of a lens.

In the first embodiment, the lens barrel portion is heated by the heater, thereby reducing the difference in temperature between the upper side and the lower side of the projection lens. For this reason, it is preferable that each lens in the projection lens 15 is provided at a position where a satisfactory image is to be formed in a state where a predetermined temperature is reached as a result of heating. With this arrangement, it is possible to form a preferable image in a state where the projection lens is heated by operating the projector.

Although the position where the heater 33 is provided is not particularly limited as long as the lens barrel portion on the side opposite to the direction, in which the image forming panel 14 is shifted, can be heated, it is preferable that the heater is provided at the position of a lens having the greatest influence on degradation of lens performance with inclination among a plurality of lenses in the projection lens 15. The heater is provided at the position of the lens having the greatest influence on degradation of lens performance, and the lens having the greatest influence on degradation of lens performance is heated, whereby the difference in temperature of the lens between the direction, in which the image forming panel is shifted, and the opposite side is reduced, and it is possible to prevent degradation of quality of an image to be formed.

According to first embodiment, the heater is provided in a portion where passage amount of light is small and the temperature is not increased, thereby reducing the difference in temperature between the upper side and the lower side of the projection lens. With this, since it is possible to prevent the projection lens from being inclined due to the difference in temperature in the direction perpendicular to the optical axis of the projection lens, it is possible to prevent degradation of quality of an image to be projected due to the inclination of the projection lens.

Second Embodiment

Figure 5:
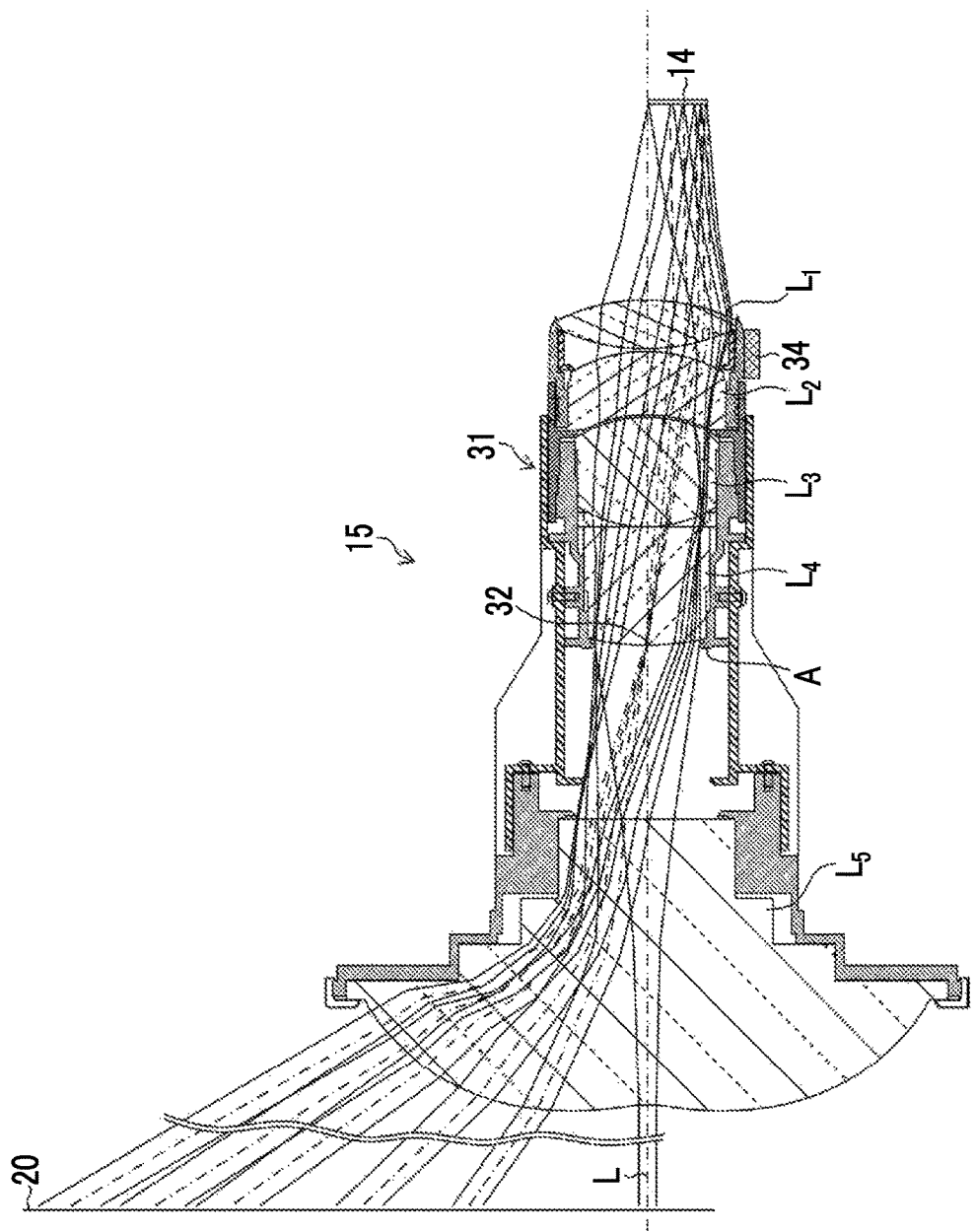
FIG. 5 is a sectional side view showing the configuration of a projection lens of a second embodiment.

Next, a second embodiment will be described. FIG. 5 is a sectional side view showing a configuration of a projection lens of a projector of the second embodiment. The projector shown in the second embodiment is different from that in the first embodiment in that cooler 34 is provided instead of the heater of the projector shown in the first embodiment.

The cooler 34 is provided at a position where the lens barrel 31 in a direction, in which the image forming panel is shifted, is cooled. As described in the above-described first embodiment, since a large amount of light passes through the direction, in which the image forming panel is shifted, the temperature is increased by light passing through the projection lens. The cooler is provided in the lens barrel portion in the direction, in which the image forming panel is shifted, whereby the projection lens which is increased in temperature due to the passage of light can be cooled by the cooler. For this reason, it is possible to reduce the difference in temperature in the direction perpendicular to the optical axis of the projection lens, that is, between the upper side and the lower side of the projection lens projection lens. Accordingly, since it is possible to prevent the projection lens from being inclined due to change in temperature of a member around the projection lens, it is possible to prevent degradation of quality of an image to be projected.

Even in the cooler shown in the second embodiment, as in the first embodiment, it is preferable that a first sensor and a second sensor are provided, and the cooler is controlled based on the temperature of the lens barrel measured by the first sensor and the temperature of the lens barrel measured by the second sensor. It is preferable that the cooler is controlled such that the difference in temperature between the temperature of the lens barrel measured by the first sensor and the temperature of the lens barrel measured by the second sensor becomes a predetermined difference in temperature. The "predetermined difference in temperature" can be set in the same manner as in the first embodiment. In the second embodiment, the difference in temperature between the upper side and the lower side of the projection lens is reduced by cooling the lens barrel, and even if the temperature of a lens on a side, through which light passes, is lower than the temperature of a lens on a side, through which light does not pass, there is no deformation of a holding member of a lens. For this reason, it is possible to set the range of the predetermined difference in temperature broader than that in the first embodiment.

As the cooler, a Peltier element or a heat sink having air blower can be used. In a Peltier element, a current flows into a junction of two metals, thereby moving heat from one metal to the other metal. For this reason, the Peltier element absorbs heat of the projection lens on one surface and generates heat on an opposite surface, thereby cooling a lens of the projection lens. Furthermore, a heat sink having air blower can be used. For the heat sink, a metal, such as aluminum or copper, through which heat is easily conducted is used, whereby it is possible to release heat and to decrease a temperature. In addition, the air blower is provided and the amount of movement of air is forcibly increased, whereby it is possible to increase a heat release effect and to improve cooling performance.

In the second embodiment, the lens barrel which is increased in temperature with the passage of light is cooled by the cooler, thereby further reducing the difference in temperature between the upper side and the lower side of the projection lens. For this reason, it is preferable that each lens in the projection lens 15 is provided such that a preferable image is formed at a temperature cooled by the cooler.

Even in the second embodiment, it is preferable that the cooler 34 is provided at the position of a lens having the greatest influence on degradation of lens performance with inclination due to the difference in temperature of the barrel between a direction, in which the image forming panel is shifted, and an opposite direction among a plurality of lenses in the projection lens 15, and the lens having the greatest influence on degradation of lens performance is cooled.

Third Embodiment

Figure 6:
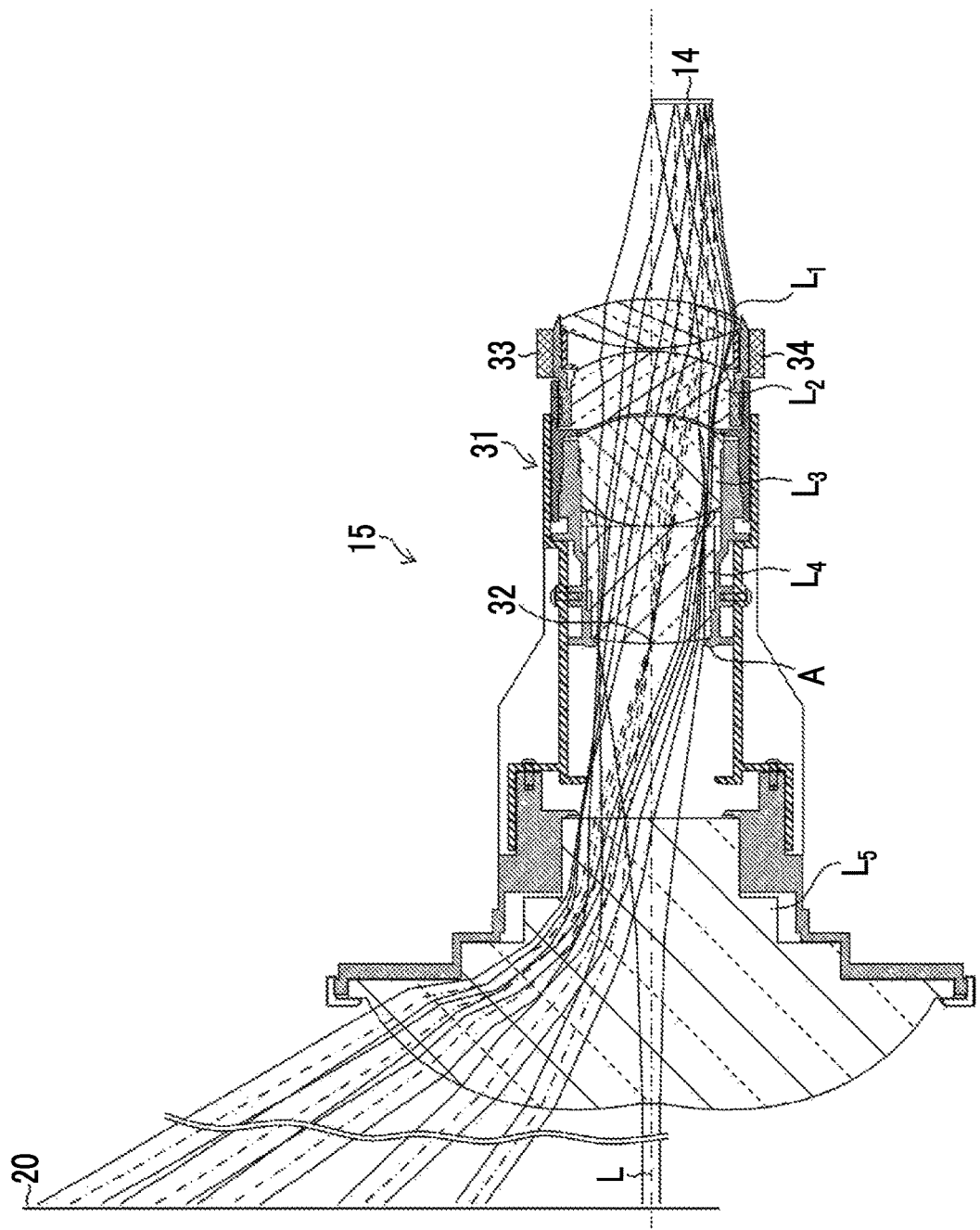
FIG. 6 is a sectional side view showing the configuration of a projection lens of a third embodiment.

FIG. 6 is a sectional side view of a configuration of a projection lens of a projector of a third embodiment. The third embodiment is different from the first embodiment and the second embodiment in that both of the heater 33 and the cooler 34 are provided. The heater and the cooler are provided, whereby it is possible to perform temperature control with ease and with high accuracy.

As the heater and the cooler, the same devices as those in the first embodiment and the second embodiment can be used. Similarly, the temperature control can be performed by the first sensor and the second sensor. In the third embodiment, either of the heater or the cooler may be selectively operated according to the difference in temperature of the lens barrel measured by the first sensor and the second sensor, or both of the heater and the cooler may be operated. At least one of the heater or the cooler is controlled such that the temperature of the lens barrel measured by the first sensor and the temperature of the lens barrel measured by the second sensor have a predetermined difference in temperature. The heater and the cooler are provided, and the heater and the cooler are controlled simultaneously, whereby it is possible to rapidly perform the temperature control.

In this embodiment, the temperature control is performed, thereby preventing a lens in the projection lens from being inclined due to temperature. Accordingly, it is preferable that an initial position of the projection lens is set to make an image to be formed at a temperature subjected to the temperature control a satisfactory image.

In regards to the positions where the heater and the cooler are provided, as in the first embodiment and the second embodiment, it is preferable that the heater and the cooler are provided in a lens barrel at the position of a lens having the greatest influence on degradation of lens performance with inclination among a plurality of lenses in the projection lens. It is preferable that the heater 33 and the cooler 34 are provided at the same positions in the direction perpendicular to the optical axis of a lens in the projection lens 15.

EXPLANATION OF REFERENCES

10: projector, 11: housing, 13: light source device, 14: image forming panel, 15: projection lens, 17: control device, 18: image forming surface, 20: screen, 21: zoom dial, 22: light amount adjustment dial, 23: focus dial, 24: up/down pint adjustment dial (tilt-and-shift operating member), 25: right/left pint adjustment dial (tilt-and-shift operating member), 26: screen correction dial (screen shape correction member), 31: lens barrel, 32: diaphragm position, 33: heater, 34: cooler, 51: LED, 52, 53: dichroic mirror, A: aperture diaphragm, L: optical axis

What is claimed is:

1. A projector comprising:
an image forming panel on which an image is formed; and
a projection lens which projects the image of the image forming panel,
wherein the center of the image forming panel is fixed with being shifted with respect to an optical axis of the projection lens, and a central position of the projected image of the image forming panel is deviated in a direction opposite to a direction, in which the center of the image forming panel is shifted, and
a lens barrel of the projection lens includes heater for heating a lens barrel portion on a side opposite to the direction, in which the image forming panel is shifted, on the image forming panel side from a diaphragm position where an F-Number of the projection lens is determined.

2. The projector according to claim 1, further comprising:
a first sensor which measures a temperature of the lens barrel on the side opposite to the direction, in which the image forming panel is shifted;
a second sensor which measures a temperature of the lens barrel in the direction, in which the image forming panel is shifted; and
controller for controlling the heater based on the difference between a measurement result of the temperature of the lens barrel by the first sensor and a measurement result of the temperature of the lens barrel by the second sensor.

3. The projector according to claim 2,
wherein the controller heats with the heater until the difference between the measurement result of the temperature of the lens barrel by the first sensor and the measurement result of the temperature of the lens barrel by the second sensor becomes equal to or less than a predetermined difference in temperature.

4. The projector according to claim 1,
wherein the heater is provided in the lens barrel at a position of a lens having the greatest influence on degradation of lens performance due to the difference in temperature of the projection lens between a direction, in which the image forming panel is shifted, and a direction opposite to the direction, in which the image forming panel is shifted, on the image forming panel side from the diaphragm position where the F-Number is determined, among a plurality of lenses constituting the projection lens.

5. The projector according to claim 2,
wherein the heater is provided in the lens barrel at a position of a lens having the greatest influence on degradation of lens performance due to the difference in temperature of the projection lens between a direction, in which the image forming panel is shifted, and a direction opposite to the direction, in which the image forming panel is shifted, on the image forming panel side from the diaphragm position where the F-Number is determined, among a plurality of lenses constituting the projection lens.

6. The projector according to claim 3,
wherein the heater is provided in the lens barrel at a position of a lens having the greatest influence on degradation of lens performance due to the difference in temperature of the projection lens between a direction, in which the image forming panel is shifted, and a direction opposite to the direction, in which the image forming panel is shifted, on the image forming panel side from the diaphragm position where the F-Number is determined, among a plurality of lenses constituting the projection lens.

7. A projector comprising:
an image forming panel on which an image is formed; and
a projection lens which projects the image of the image forming panel,
wherein the center of the image forming panel is fixed with being shifted with respect to an optical axis of the projection lens, and a central position of the projected image of the image forming panel is deviated in a direction opposite to a direction, in which the center of the image forming panel is shifted, and
a lens barrel of the projection lens includes cooler for cooling a lens barrel portion in the direction, in which the image forming panel is shifted, on the image forming panel side from a diaphragm position where an F-Number of the projection lens is determined.

8. The projector according to claim 7,
wherein the cooler is a Peltier element or a heat sink having air blower.

9. The projector according to claim 7, further comprising:
a first sensor which measures a temperature of the lens barrel on the side opposite to the direction, in which the image forming panel is shifted;
a second sensor which measures a temperature of the lens barrel in the direction, in which the image forming panel is shifted; and
controller for controlling the cooler based on the difference between a measurement result of the temperature of the lens barrel by the first sensor and a measurement result of the temperature of the lens barrel by the second sensor.

10. The projector according to claim 8, further comprising:
a first sensor which measures a temperature of the lens barrel on the side opposite to the direction, in which the image forming panel is shifted;
a second sensor which measures a temperature of the lens barrel in the direction, in which the image forming panel is shifted; and
controller for controlling the cooler based on the difference between a measurement result of the temperature of the lens barrel by the first sensor and a measurement result of the temperature of the lens barrel by the second sensor.

11. The projector according to claim 9,
wherein the controller cools with the cooler until the difference between the measurement result of the temperature of the lens barrel by the first sensor and the measurement result of the temperature of the lens barrel by the second sensor becomes equal to or less than a predetermined difference in temperature.

12. The projector according to claim 10,
wherein the controller cools with the cooler until the difference between the measurement result of the temperature of the lens barrel by the first sensor and the measurement result of the temperature of the lens barrel by the second sensor becomes equal to or less than a predetermined difference in temperature.

13. The projector according to claim 7,
wherein the cooler is provided in the lens barrel at a position of a lens having the greatest influence on degradation of lens performance due to the difference in temperature of the projection lens between a direction, in which the image forming panel is shifted, and a direction opposite to the direction, in which the image forming panel is shifted, on the image forming panel side from the diaphragm position where the F-Number is determined, among a plurality of lenses constituting the projection lens.

14. The projector according to claim 8,
wherein the cooler is provided in the lens barrel at a position of a lens having the greatest influence on degradation of lens performance due to the difference in temperature of the projection lens between a direction, in which the image forming panel is shifted, and a direction opposite to the direction, in which the image forming panel is shifted, on the image forming panel side from the diaphragm position where the F-Number is determined, among a plurality of lenses constituting the projection lens.

15. The projector according to claim 9,
wherein the cooler is provided in the lens barrel at a position of a lens having the greatest influence on degradation of lens performance due to the difference in temperature of the projection lens between a direction, in which the image forming panel is shifted, and a direction opposite to the direction, in which the image forming panel is shifted, on the image forming panel side from the diaphragm position where the F-Number is determined, among a plurality of lenses constituting the projection lens.

16. The projector according to claim 10,
wherein the cooler is provided in the lens barrel at a position of a lens having the greatest influence on degradation of lens performance due to the difference in temperature of the projection lens between a direction, in which the image forming panel is shifted, and a direction opposite to the direction, in which the image forming panel is shifted, on the image forming panel side from the diaphragm position where the F-Number is determined, among a plurality of lenses constituting the projection lens.

17. The projector according to claim 11,
wherein the cooler is provided in the lens barrel at a position of a lens having the greatest influence on degradation of lens performance due to the difference in temperature of the projection lens between a direction, in which the image forming panel is shifted, and a direction opposite to the direction, in which the image forming panel is shifted, on the image forming panel side from the diaphragm position where the F-Number is determined, among a plurality of lenses constituting the projection lens.

18. The projector according to claim 12,
wherein the cooler is provided in the lens barrel at a position of a lens having the greatest influence on degradation of lens performance due to the difference in temperature of the projection lens between a direction, in which the image forming panel is shifted, and a direction opposite to the direction, in which the image forming panel is shifted, on the image forming panel side from the diaphragm position where the F-Number is determined, among a plurality of lenses constituting the projection lens.

19. A projector comprising:
an image forming panel on which an image is formed; and
a projection lens which projects the image of the image forming panel,
wherein the center of the image forming panel is fixed with being shifted with respect to an optical axis of the projection lens, and a central position of the projected image of the image forming panel is deviated in a direction opposite to a direction, in which the center of the image forming panel is shifted, and
a lens barrel of the projection lens includes
heater for heating a lens barrel portion on a side opposite to the direction, in which the image forming panel is shifted, on the image forming panel side from a diaphragm position where an F-Number of the projection lens is determined, and
cooler for cooling a lens barrel portion in the direction, in which the image forming panel is shifted, on the image forming panel side from the diaphragm position where the F-Number of the projection lens is determined.

20. The projector according to claim 19, further comprising:
a first sensor which measures a temperature of the lens barrel on the side opposite to the direction, in which the image forming panel is shifted;
a second sensor which measures a temperature of the lens barrel in the direction, in which the image forming panel is shifted; and
controller for controlling the heater and the cooler selectively or simultaneously according to the difference between a measurement result of the temperature of the lens barrel by the first sensor and a measurement result of the temperature of the lens barrel by the second sensor.

* * * * *